(12) United States Patent
Kazushige

(10) Patent No.: US 7,576,811 B2
(45) Date of Patent: Aug. 18, 2009

(54) PLANAR LIGHT SOURCE UNIT AND LIQUID CRYSTAL DISPLAY DEVICE USING THE UNIT

(75) Inventor: Ida Kazushige, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 196 days.

(21) Appl. No.: 11/730,383

(22) Filed: Mar. 30, 2007

(65) Prior Publication Data

US 2007/0242476 A1 Oct. 18, 2007

(30) Foreign Application Priority Data

Apr. 6, 2006 (JP) ............................. 2006-105649

(51) Int. Cl.
*G02F 1/1335* (2006.01)

(52) U.S. Cl. .............................. 349/65; 349/61; 349/62; 349/63; 349/64; 349/66; 349/67; 349/68; 349/69; 349/70; 349/71; 362/611

(58) Field of Classification Search .................. 349/58, 349/61–71; 362/611
See application file for complete search history.

(56) References Cited

U.S. PATENT DOCUMENTS

| 6,392,723 | B1* | 5/2002 | Sugiyama et al. | ............. 349/58 |
| 7,327,417 | B2* | 2/2008 | Kitagawa et al. | ............. 349/65 |
| 2006/0038933 | A1* | 2/2006 | Hashimoto | .................. 349/58 |

FOREIGN PATENT DOCUMENTS

JP 2000-294024 10/2000

* cited by examiner

*Primary Examiner*—David Nelms
*Assistant Examiner*—Thanh-Nhan P Nguyen
(74) *Attorney, Agent, or Firm*—Finnegan, Henderson, Farabow, Garrett & Dunner, L.L.P.

(57) ABSTRACT

A planar light source unit includes a metal frame retaining a light source panel provided with an light guide for inducing emission of light from a light source and a plastic frame that supports at least part of a peripheral edge of the light guide. The outer peripheral surface of the plastic frame with a fitting structure between the metal frame and the plastic frame and an outer frame portion contiguous to the support plate portion and sandwiched between the fixing means and the outer frame portion of the metal frame. A liquid crystal display panel is provided with a display region in which plural display pixels are arrayed and the planar light source unit.

8 Claims, 3 Drawing Sheets

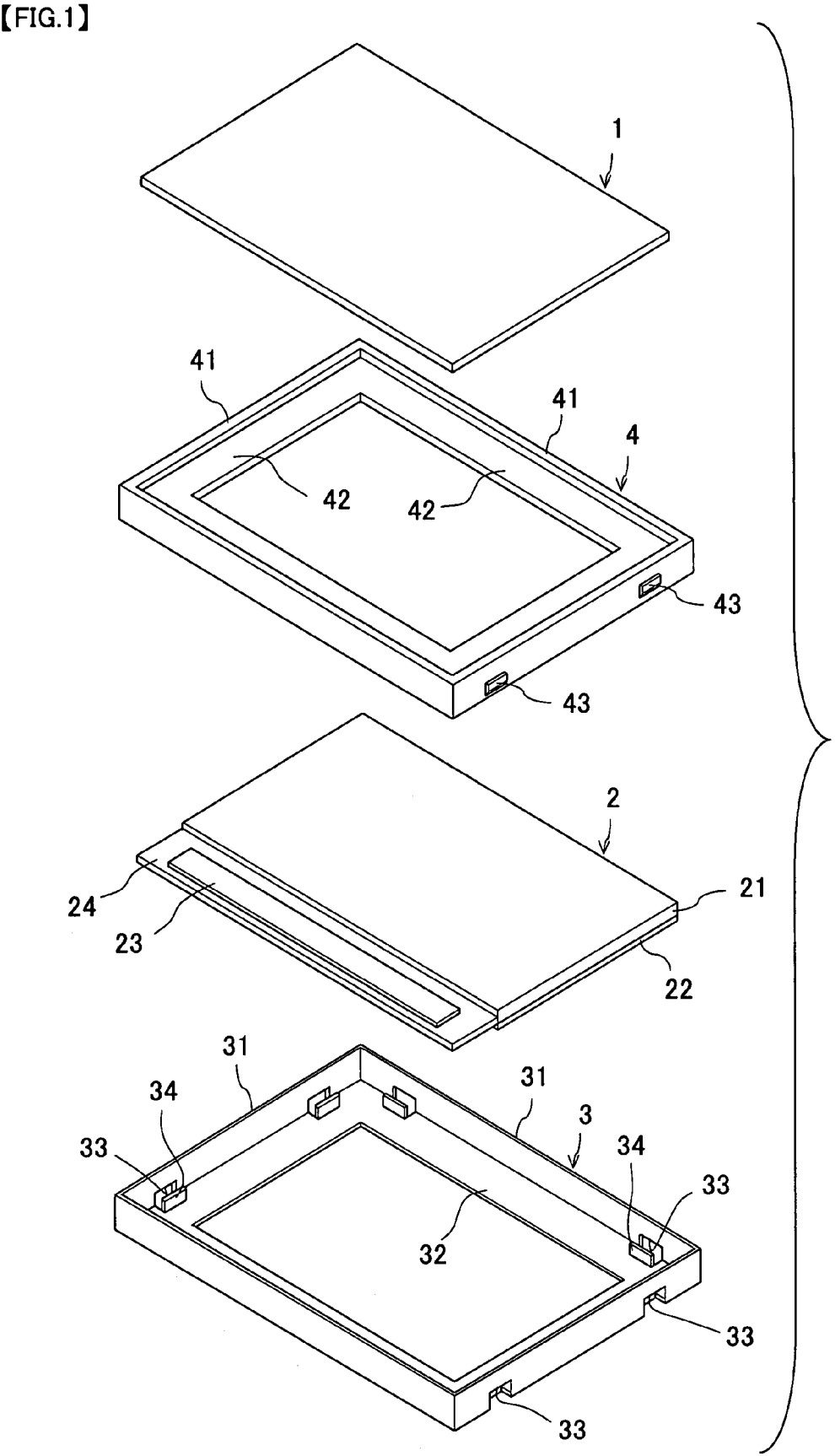
[FIG.1]

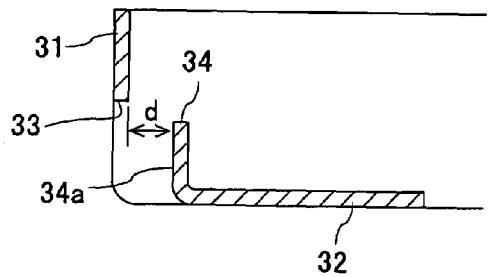
[Fig.2]
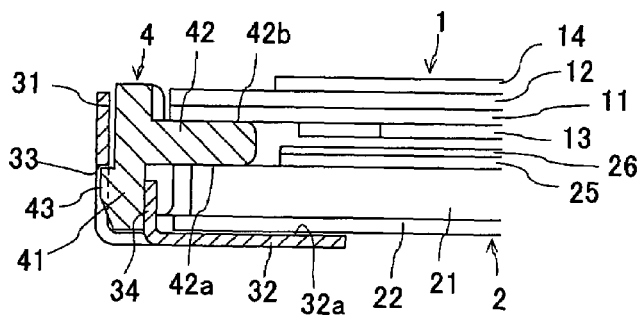
[FIG.3]
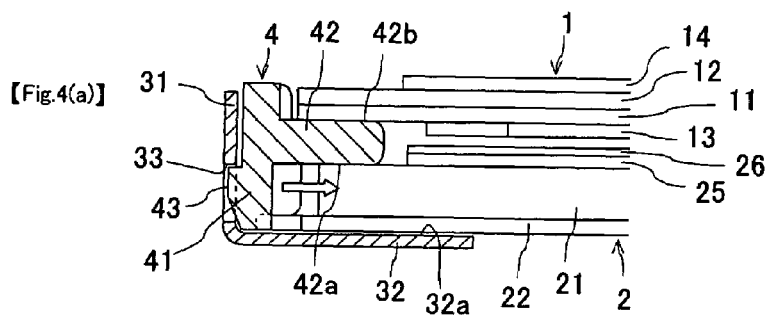
[Fig.4(a)]
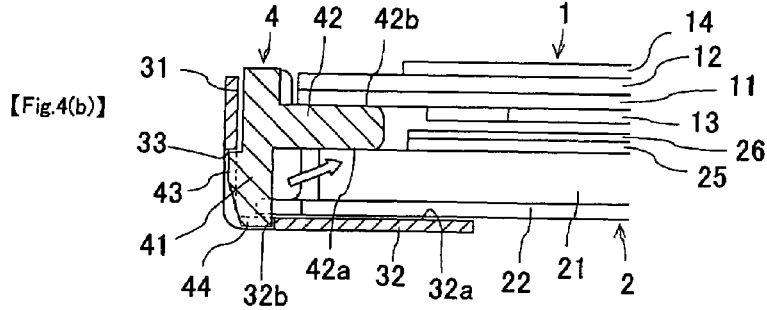
[Fig.4(b)]
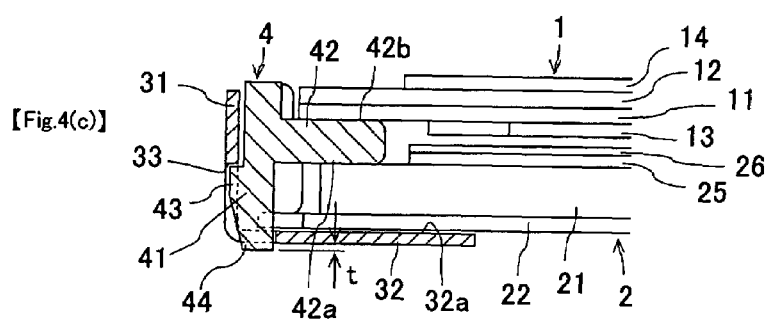
[Fig.4(c)]

[Fig.5]
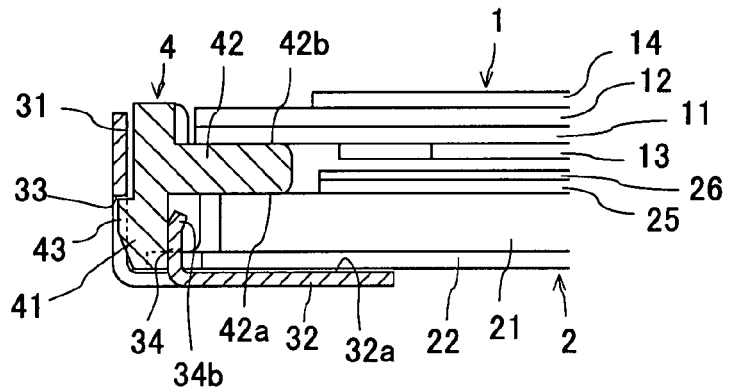
[Fig.6]
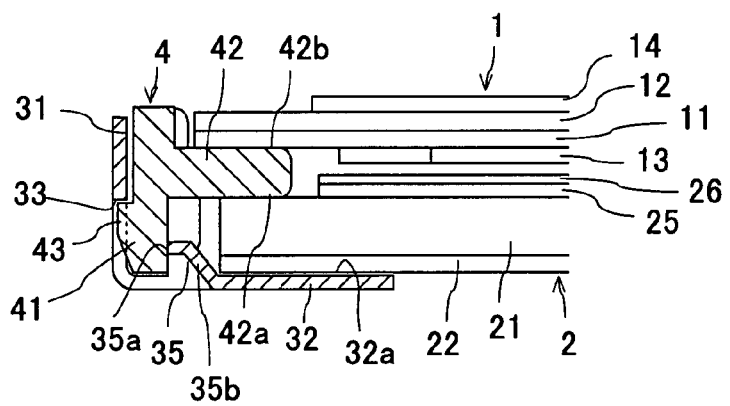
[Fig.7]
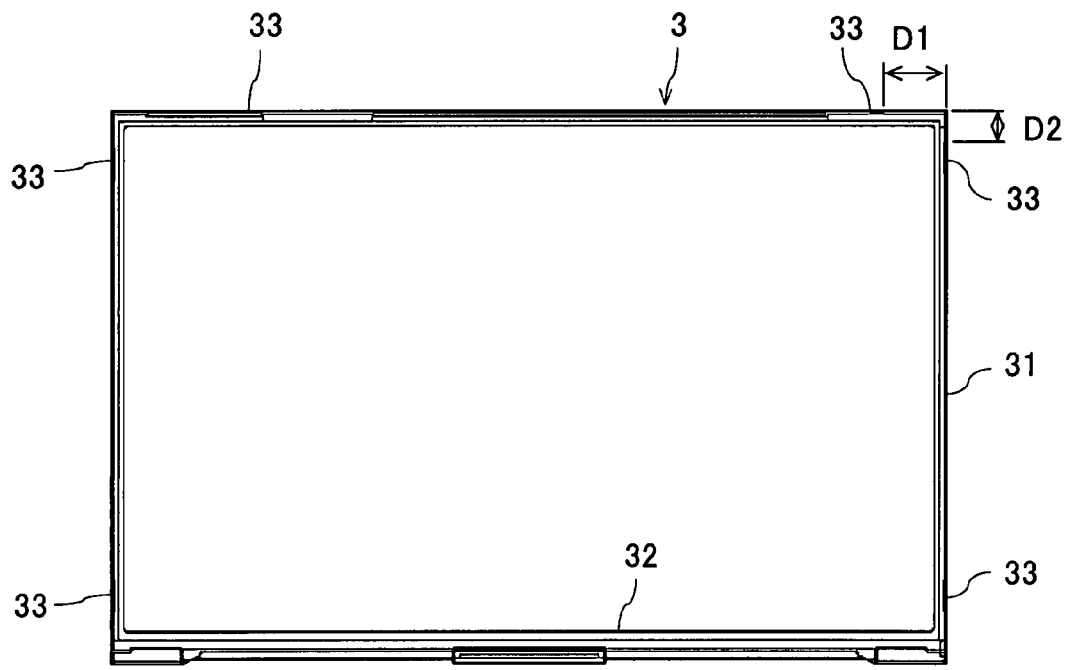

PLANAR LIGHT SOURCE UNIT AND LIQUID CRYSTAL DISPLAY DEVICE USING THE UNIT

BACKGROUND OF THE INVENTION

1. Field of the Invention

The present invention relates to a planar light source unit used in a liquid crystal display device, for example, and to a liquid crystal display device using the planar light source unit.

2. Description of the Related Art

In recently years, as display devices for information technology (IT) devices including personal computers, word processors, etc. and for video equipment including television sets, camcorders, car navigation systems, etc., liquid crystal display devices having lightweight, thin-shaped and low-power-consumption properties have been in heavy usage. Major ones of these liquid crystal display devices have a configuration provided with a built-in lighting unit (planar light source unit) for emitting light from behind a liquid crystal panel in order to realize a bright display screen.

The lighting unit is classified into an edge light type lighting unit and a direct light type lighting unit depending on the disposition place of a light source. The edge light type lighting unit is a lighting unit having a system in which a light source is disposed at the edge of an light guide opposed to the liquid crystal display panel. The direct light type lighting unit has a system wherein plural straight tube light sources, such as fluorescence discharge tubes, are disposed at the back surface of a liquid crystal display panel and a diffusion plate is disposed between the liquid crystal display panel and the light sources. Of these systems, the edge light system is advantageous in making the lighting unit thin and suitable for portable electronic devices, for example.

When a planar light source unit of the edge light system is to be incorporated into a liquid crystal display device, for example, it is necessary to dispose a planar light source equipped with the light guide on the side of the back surface of a liquid crystal display panel. In a conventional thin liquid crystal display device of edge light system using a tubular light source or an LED light source, for example, as a structure for retaining an light guide and sheets, the structure for retaining the shape of a planar light source unit through fit-connection (engagement) between a metal frame disposed at the back surface of a reflection sheet and a plastic frame supporting the outer peripheral portion of the light guide has been adopted (refer, for example, to JP-A 2000-294024).

JP-A 2000-294024 reference discloses a liquid crystal display device equipped with a liquid crystal display panel, a metal bezel and a resin frame that retain the liquid crystal display panel, and a planar light source unit and also discloses a fitting structure in which the frame and bezel are joined to each other through engagement of plural projections protruding from the sidewall of the frame in plural openings formed in the sidewall of the bezel. To be specific, in the liquid crystal display device described in JP-A 2000-294024, a structure of forming holes for fitting (openings) in the metal frame (bezel) laid along the side surface of the display device and fitting the projections of the plastic frame in the holes is adopted as the fitting structure.

In the fitting structure between a metal frame and a plastic frame, however, entails a ready disengagement problem due to a difference in finished dimensions of the metal frame and plastic frame, a variation in assemble of the plastic frame or other such disadvantages. When this fit-disconnection problem arises, dimensional stability of the display device will be deteriorated and the display device will have to be assembled while frequently correcting the position of the plastic frame during the assembly process, resulting in increasing the number of working process and making the processes cumbersome and complicated.

The present invention has been proposed in view of the conventional technical problems mentioned above, and the object thereof is to provide a planar light source unit and a liquid crystal display device that can stably be assembled without inducing disengagement between a metal frame and a plastic frame, excel in dimensional stability, avoid an increase in manufacturing cost resulting from increased number of working process and cumbersome and complicated processes and have structures suitable for their small thickness.

SUMMARY OF THE INVENTION

To attain the above object, the present invention provides a planar light source unit comprising a metal frame that has a bottom plate portion retaining a light source panel provided with an light guide for inducing emission of light from a light source, an outer frame portion contiguous to the bottom plate portion and fixing means formed on the bottom plate portion and disposed abeam of or toward the outer frame portion, and a plastic frame that has a support plate portion for supporting at least part of a peripheral edge of the light guide with a fit-connection structure between the metal frame and the plastic frame and an outer frame portion contiguous to the support plate portion and sandwiched between the fixing means and the outer frame portion of the metal frame.

Also, in the present invention, a fitting structure for engaging the engaging pawls of the plastic frame in the fitting holes of the metal frame is adopted. In this case, provision of a clearance between the metal frame and the plastic frame in view of the difference in thermal expansion between the two, etc. would possibly induce the ready disengagement between the engaging pawls and the fitting holes as described above.

In the present invention, therefore, the fixing means formed on the metal frame serve to support the inner peripheral surface side of the plastic frame and avoid the disengagement. Specifically, folded pieces are formed as the fixing means on the metal frame and brought into surface contact with the inner peripheral surface side to support the surface side. Otherwise, the end faces of fixing portions formed as the fixing means by means of drawing are abut on the inner peripheral surface side of the plastic frame to support the surface side. With this, the plastic frame is positioned in a state of substantially no clearance between the metal frame and the plastic frame (in a state wherein the outer peripheral surface of the plastic frame is in contact with the inner peripheral surface of the metal frame) to make it difficult to induce the disengagement.

As means for making it difficult to induce the disengagement, it is conceivable to adopt a structure in which projections of a plastic frame are fit in fitting holes also formed in a metal frame on the back surface of a light source panel. In this case, however, a satisfactory effect cannot be obtained when the metal frame has a small thickness. When the metal frame is thin, the fitting is easy to disengage due to a gap between the plastic frame and the metal frame. Even slight gap, if any, will possibly result in disengagement similarly to the case of the mere fitting at the side surface alone. In addition, as means for reinforcing the fitting structure in which the projections are fitted in the fitting holes, it is conceivable to gain the height of the projections on the plastic frame. In this case, however, the projections of the plastic frame will bulge out from the metal frame, resulting in an increase in thickness of the planar light source unit or liquid crystal display device as a whole.

It is unnecessary for the present invention to adopt the structure in which projections of a plastic frame are fit in fitting holes also formed in a metal frame on the back surface of a light source panel. Without adopting such structure, the present invention enables elimination of the disengagement of the plastic frame with exactitude. Also, it is unnecessary for the present invention to gain the height of the projections of the plastic frame. Since this brings about no case where the projections of the plastic frame bulge out from the metal frame, there is no case where the thickness of the planar light source unit or liquid crystal display device increases.

According to the present invention, it is possible to stably assemble the metal frame and plastic frame without inducing the disengagement thereof, enabling the provision of an inexpensive, thin planar light source unit or liquid crystal display device excellent in dimensional stability.

The above and other objects, characteristic features and advantages will become apparent to those skilled in the art from the description to be given herein below with reference to the accompanying drawings.

BRIEF DESCRIPTION OF THE DRAWINGS

FIG. 1 is an exploded perspective view showing one example of a liquid crystal display device according to the present invention.

FIG. 2 is a schematic cross section of the principal portion of a metal frame showing a fitting hole and a folded piece.

FIG. 3 is a schematic cross section of the principal portions of the metal frame and a plastic frame showing the assembled state of the two frames.

FIG. 4(a) is a schematic cross section showing one example of a fitting configuration using no folded piece, FIG. 4(b) is a schematic cross section showing one example of a fitting configuration concomitantly using fitting by a projection and FIG. 4(c) is a schematic cross section showing one example of a fitting configuration having a projection protruded.

FIG. 5 is a schematic cross section of the principal portion showing another example of the folded piece.

FIG. 6 is a schematic cross section of the principal portion showing still another example of the folded piece.

FIG. 7 is a schematic plan view showing the positions at which fitting holes are formed in the metal frame.

DETAILED DESCRIPTION OF PREFERRED EMBODIMENT

The planar light source unit and liquid crystal display device according to the present invention will be described hereinafter with reference to the accompanying drawings.

FIG. 1 is an exploded perspective view showing a liquid crystal display device having a planar light source unit incorporated into it. The liquid crystal display device of this embodiment is provided, as shown in FIG. 1, with a liquid crystal display panel 1 and a light source panel 2 that are retained with a combination of a metal frame 3 and a plastic frame 4.

The liquid crystal display panel 1 comprises an array substrate, an opposed substrate and a liquid crystal material inserted between the two substrates, for example. The array substrate is formed with pixel electrodes corresponding to display pixels and a switching device (thin-film transistor) in matrix form. Also, on the liquid crystal panel 1, signal lines for transmitting signals to the pixel electrodes and gate lines for transmitting switching signals to the thin-film transistor that is the switching device are wired to be orthogonal to each other. On the other hand, the opposed substrate is provided substantially over the entire surface thereof with opposed electrodes formed of a transparent electrode material (ITO, for example) and with color filter layers corresponding to pixels. Furthermore, polarization plates are bonded to the outer surfaces of the array and opposed substrates, respectively, so that their polarization axes may be perpendicular to each other.

To the liquid crystal display panel 1 having the configuration described above, a circuit board for supplying operation signals to the liquid crystal display panel 1 is electrically connected. The switching device is operated based on the operation signals transmitted from the circuit board to display images. The region in which the images are displayed is a display region and, therefore, the liquid crystal display panel 1 has a display region in which plural display pixels are arrayed.

The light source panel 2 is incorporated as a back light of the liquid crystal display panel 1 into the liquid crystal display device and equipped with an light guide 21 for irradiating the back surface of the liquid crystal display panel 1 with light from a light source and a reflection sheet 22 disposed on the back surface of the light guide 21. The light source is disposed along at least one side of the light guide 21. In the present embodiment, a light source circuit board 24 having an LED light source 23 mounted thereon is disposed along a long side of the light guide 21. The light emitted from the LED light source 23 is led directly or after being reflected on the reflection sheet 22 to the light guide 21, passed through the light guide 21 and thereafter irradiated onto the liquid crystal display panel 1. The irradiated light is transmitted to the light guide 21 to display images, such as letters, pictures, etc., on the liquid crystal display panel 1 with predetermined brightness.

The metal frame 3 is formed of any of metal materials, such as stainless steel, and the plastic frame 4 of any of various plastic materials. The metal frame 3 and plastic frame 4 have outer frame portions 31 and 41, respectively, formed substantially perpendicularly relative to the principal surfaces of the liquid crystal display panel 1 and light source panel 2 for retaining the peripheries of the panels 1 and 2, respectively. The metal frame 3 has a bottom plate portion 32 bulged out inward from the bottom thereof to support thereon the periphery of the bottom of the light source panel 2. Similarly, the plastic frame 4 has a support plate portion 42 bulged out inward from the center position of the height thereof to support thereon the outer periphery of the light source panel 2 from above. Thus, the light source panel 2 is supported as sandwiched between the bottom plate portion 32 of the metal frame 3 and the support plate portion 42 of the plastic frame 4. In addition, the support plate portion 42 of the plastic frame 4 also serves to support thereon the periphery of the bottom of the liquid crystal display panel 1.

The metal frame 3 and plastic frame 4 are assembled by means of their fitting structure to retain the light source panel 2. Therefore, the fitting structure of the metal frame 3 and plastic frame 4 will next be described.

As the fitting structure for assembling the metal frame 3 and plastic frame 4, the present embodiment adopts a fitting structure using fitting holes and engaging pawls. To be specific, fitting holes 33 are formed in the outer frame portion 31 of the metal frame 3, whereas engaging pawls 43 are formed on the outer peripheral surface of the outer frame portion 41 of the plastic frame 4, and the engaging pawls 43 are engaged in the fitting holes 33 to fix the metal frame 3 and plastic frame 4 to each other.

What is characterized here lies in that the fitting holes 33 are formed in the metal frame 3 and, at the same time, that folded pieces 34 are formed as uprising inward of the fitting holes 33 as fixing means. According to an ordinary practice when forming the fitting holes 33 in the metal frame 3, it will be only required to form the fitting holes 33 alone in the metal frame 3. In the present embodiment, however, notched pieces produced in consequence of forming the fitting holes 33 are used as the folded pieces 34. That is to say, when forming a fitting hole 33, a notched piece is not cut off the fitting hole 33, but allowed to remain, with one side of the notched piece connected to the metal frame 3. The notched piece is caused to uprise (folded) substantially in parallel to the outer frame portion 31 of the metal frame 3 to constitute the folded piece 34. A distance "d" between the folded piece 34 and the outer frame portion 31 shown in FIG. 2 is set to be substantially equal to or slightly smaller than the thickness of the bottom side part of the outer frame portion 41 of the plastic frame 4.

The engaging pawls 43 formed on the plastic frame 4 are formed in the shape of projections (pawls) engageable in the fitting holes 33 at positions corresponding to the positions of the fitting holes 33 formed in the metal frame 3. In the present embodiment, two fitting holes 33 and two folded pieces 34 are formed at each of three sides of the outer frame portion 31 of the metal frame 3 and correspondingly two engaging pawls 43 are formed at each of three sides of the outer frame portion 41 of the plastic frame 4 as protruding outward.

The engaging pawls 43 formed on the plastic frame 4 are pressed into the fitting holes 33 of the metal frame 3 while slightly deforming the metal frame 3 or plastic frame 4, thereby enabling the metal frame 3 and plastic frame 4 to be assembled. The assembled state of the two frames 3 and 4 is shown in FIG. 3.

In the state mentioned above, the engaging pawls 43 formed on the plastic frame 4 are engaged in the fitting holes 33 formed in the metal frame 3, thereby configuring a fitting structure. In the fitting structure, the back surface of the light source panel 2 (back surface of the reflection sheet 22) is supported on a top surface 32a of the bottom plate portion 32 of the metal frame 3 and, at the same time, the outer peripheral edge part of the front surface of the light source panel 2 is supported on the back surface 42a of the support plate portion 42 of the plastic frame 4. That is to say, the light source panel 2 is fixed, with the peripheral part thereof sandwiched between the metal frame 3 and the plastic frame 4. Incidentally, optical sheets including a light diffusion sheet 25 and a prism sheet 26 are attached to the front surface of the light guide 21 of the light source panel 2. On the other hand, the peripheral edge part of the back surface of the liquid crystal display panel 1 is supported on the top surface of the support plate portion 42 of the plastic frame 4. Further, as described earlier, the liquid crystal display panel 1 comprises an array substrate 11 and an opposed substrate 12, the outer surfaces of which have polarization plates 13 and 14 bonded thereto, respectively, so that their polarization axes may be made perpendicular to each other. The liquid crystal panel 1 is fixed in a bezel-less mode wherein it is fixed directly on the plastic frame 4 or metal frame 3 with a black light-shielding tape (not shown) or in a mode wherein it is fixed as sandwiched between the plastic frame 4 and a metal bezel prepared separately.

In the fitting structure, as described above, the engaging pawls 43 formed on the plastic frame 4 are engaged in the fitting holes 33 formed in the metal frame 3 to fix the plastic frame 4 to the metal frame 3. Here, in the present embodiment, the outer peripheral surface of the fixed plastic frame 4 is brought into contact with the inner peripheral surface of the metal frame 3, with the inner peripheral surface of the plastic frame 4 supported on one side face 34a of the folded piece 34. In other words, the plastic frame 4 is elastically sandwiched between the inner wall surface of the outer frame portion 31 and the one side face 34a of the folded piece 34 of the metal frame 3. As a result, there is no clearance between the metal frame 3 and the plastic frame 4 to realize the firm fitting.

In FIG. 4(a) having no folded piece 34, for example, the plastic frame readily moves in the direction indicated by an arrow shown therein to possibly induce disengagement between the engaging pawl 43 and the fitting hole 33. When the disengagement has been induced, the plastic frame 4 is disengaged from the metal frame 3, with the result that it is impossible to maintain the state of the light source panel 2 retained in the initially set state. For this reason, the relative positions of the liquid crystal display panel 1 and the light source panel 2 fluctuate to possibly induce irregular brightness or dark places on the liquid crystal display panel 1.

In order to solve the problems mentioned above, it is conceivable, as shown in FIG. 4(b), that the fitting hole 33 is formed in a size reaching the back surface of the metal frame 3, that a projection 44 is formed on the bottom side part of the plastic frame 4 and that both the projection 44 and the engaging pawl 43 are fitted in the fitting hole 33. In this case, since the inner peripheral surface of the plastic frame 4 is supported on an end part 32b of the bottom plate portion 32 of the metal frame 3 (end part of the fitting hole 33), a stabilized fitting state can be expected. When the metal frame 3 has a small thickness, however, the amount of the projection 44 fitted becomes slight to readily move the plastic frame 3 in the direction indicated by an arrow shown in FIG. 4(b), thereby possibly inducing ready disengagement between the fitting hole 33 and the engaging pawl 43.

It is also conceivable, as shown in FIG. 4(c), that the height of the projection 44 is gained to increase the amount of the projection 44 fitted. When the amount of the projection 44 fitted has been increased, the movement of the plastic frame 4 in the arrow direction in FIG. 4(b) can be regulated to stabilize the fitting state. In this case, however, the projection 44 has a distal end protruding from the metal frame 3, resulting in an increase in thickness of the entire planar light source unit and eventually the entire liquid crystal display device by an amount "t" of protrusion.

To the contrary, in the fitting structure of the present embodiment, since the inner peripheral surface of the plastic frame 4 is supported on the folded pieces 34 formed on the metal frame 3, firm fitting structure can be realize without moving the plastic frame 4 readily as in the configuration shown in FIG. 4(a). Furthermore, differently from the configuration shown in FIG. 4(b), there is no case where the fitting intensity varies depending on the thickness of the metal frame 3. In recent years, it has been needed to make lightweight and thin parts constituting a liquid crystal display device etc. Also, while the metal frame 3 is no exception and is formed to have a smaller thickness, even when the metal frame 3 has such a smaller thickness, it is required that fitting of the plastic frame 4 be made reliable. This case can also be coped with sufficiently adopting the configuration of the present embodiment. When the metal frame 3 has a thickness of around 0.4 mm, for example, even the configuration shown in FIG. 4(b) can stabilize the fitting state to a certain extent. When the thickness of the metal frame 3 is 0.3 mm or less, however, it will be difficult to stabilize the fitting state with the configuration shown in FIG. 4(b). It can therefore be said that the configuration of the present embodiment is particularly effective when the metal frame 3 has a thickness of 0.3 mm or less, and is advantageous in respect of the small-thickness property as compared with the configuration shown in FIG. 4(c). In the fitting structure of the present invention, it is possible to obviate the need for providing the plastic frame 4 with the projection 44 and protruding the distal end of the projection 44 from the metal frame 3. Thus, the thickness of a planar light source unit or a liquid crystal display device will not be increased.

As described above, in the planar light source unit and the liquid crystal display device according to the present embodiment, the folded pieces 34 function to realize the firm fitting structure. Here, the shape of the folded pieces 34 is not limited to that shown in FIG. 2 or FIG. 3, but can suitably be modified. FIG. 5, for example, shows an example wherein the folded piece 34 has a distal end 34b bent inward so that the distance between itself and the outer frame portion 31 may be enlarged. When incorporating the plastic frame 4 into the metal frame 3, the bottom portion of the plastic frame 4 comes to be inserted between the outer frame portion 31 and the folded piece 34 of the metal frame 3. At this time, when the distal end 34b of the folded piece 34 bent inward as in this example, smooth insertion can be accomplished. Furthermore, in this instance, the folded piece 34 is inclined outward so that the distance "d" between the folded piece 34 and the outer frame portion 31 may be slightly narrower than the thickness of the outer frame portion 41 of the plastic frame 4, and the distance between the distal end 34b of the folded piece 34 and the outer frame portion 31 is made larger than the distance "d". As a result, the plastic frame 4 is easy to insert using the elastically of the folded piece 34 without altering the method of insertion and can elastically be retained more firmly.

On the other hand, FIG. 6 shows an example wherein a fixing portion 35 constituting the fixing means is formed by means of so-called drawing so that it may be mounded from the bottom plate portion 32. In this example, while the distal end 35a on the fixing portion 35 supports the plastic frame 4, a firm fitting structure can be realized similarly to the embodiment shown in FIG. 3. Also, in this example, an incline part 35b of the fixing portion 35 is designed so that it may abut on the periphery of the light guide 21 or reflection sheet 22 of the light source panel 2. As a result, the fixing portion 35 can serve as the positioning means for the light source panel 2.

Incidentally, in any of the fitting structures, the number of the structures and the formation positions thereof are optional. In the structure shown in FIG. 1, for example, two fitting holes 33 or engaging pawls 43 are formed in or on each of the three sides of a frame. This is not limitative. They may be formed in or on each of the four sides of the frame. The formation thereof in or on each of the two sides of the frame will suffice. The number of the fitting holes or engaging pawls is not limited to two, but may be three or more. However, the formation position is preferably apart somewhat from the corner of the frame. The portions on which stress accompanied by the dimensional tolerance or thermal expansion is best exerted are the corners of the metal frame 3 or plastic frame 4. Therefore, it is preferred that the corners are made free so as to absorb the tolerance or stress and that the fitting holes 33 and engaging pawls 43 or the folded pieces 34 and fitting portions constituting the fixing means are formed in or on the positions on which absorption action is little exerted. To be specific, in the metal frame 3, for example, as shown in FIG. 7, it is preferred that each of distances D1 and D2 from the corner to the fitting hole 33 and the fixing means is 15 mm or more. The distances D1 and D2 of 20 mm or more are more preferable. When the distances D1 and D2 are set smaller, the clearance will be made insufficient to possibly fail to absorb the dimensional tolerance or thermal expansion, resulting in inducing distortion. In addition, the engaging pawls 43 of the plastic frame 4 are inserted with difficulty into the fitting holes 33. Furthermore, the folded pieces 34 have been described as being formed integrally with the corresponding fitting holes 33 when being formed. However, it is not always necessary for the folded pieces 34 to be formed in opposition to the fitting holes 33. Even when the folded pieces 34 or fixing portions 35 are formed separately at positions different from the positions of the fitting holes 33, similar effects can be obtained. In this case, the positions of the folded pieces 34 or fixing portions 35 to be formed can freely be set, and the number or shape thereof can also be set freely. Therefore, the degree of freedom in design is enhanced.

What is claimed is:

1. A planar light source unit comprising:
   a metal frame that has a bottom plate portion retaining a light source panel provided with a light guide for inducing emission of light from a light source, an outer frame portion contiguous to the bottom plate portion and fixing means formed on the bottom plate portion and disposed abeam of or toward the outer frame portion; and
   a plastic frame that has a support plate portion for supporting at least part of a peripheral edge of the light guide with a fitting structure between the metal frame and the plastic frame and an outer frame portion contiguous to the support plate portion,
   wherein the fixing means is formed as uprising a distance inward from the outer frame portion of the metal frame, and one side of an outer frame portion of the plastic frame is sandwiched between the fixing means and the outer frame portion of the metal frame.

2. A planar light source unit according to claim 1, wherein the fixing means comprises folded pieces formed on the bottom plate portion of the metal frame for supporting an inner peripheral surface of the outer frame portion of the plastic frame.

3. A planar light source unit according to claim 2, wherein the fitting holes are notches formed in the metal frame to form notched pieces that constitute the folded pieces.

4. A planar light source unit according to claim 1, further comprising fitting holes formed in the metal frame and engaging pawls formed on an outer peripheral surface of the plastic frame and fitted in the fitting holes to form a fitting structure of the metal frame and the plastic frame.

5. A planar light source unit according to claim 1, wherein the fixing means comprises fixing portions formed by means of drawing on the bottom plate portion of the metal frame for supporting an inner peripheral surface of the outer frame portion of the plastic frame.

6. A planar light source unit according to claim 4 or claim 3, wherein the fixing means are formed at positions 15 mm or more distant from corners of the metal frame.

7. A planar light source unit according to claim 1, wherein the metal frame has a thickness of 0.3 mm or less.

8. A liquid crystal display device comprising:
   a liquid crystal display panel provided with a display region in which plural display pixels are arrayed; and
   a planar light source unit for irradiating the display region of the liquid crystal display panel with light;
   wherein the planar light source unit comprises a metal frame that has a bottom plate portion retaining a light source panel provided with a light guide for inducing emission of light from a light source, an outer frame portion contiguous to the bottom plate portion and fixing means formed on the bottom plate portion and disposed abeam of or toward the outer frame portion; and a plastic frame that has a support plate portion for supporting at least part of a peripheral edge of the light guide with a fitting structure between the metal frame and the plastic frame and an outer frame portion contiguous to the support plate portion, wherein the fixing means is formed as uprising a distance inward from the outer frame portion of the metal frame, and one side of an outer frame portion of the plastic frame is sandwiched between the fixing means and the outer frame portion of the metal frame.

* * * * *